US006651167B1

(12) United States Patent
Terao et al.

(10) Patent No.: US 6,651,167 B1
(45) Date of Patent: Nov. 18, 2003

(54) AUTHENTICATION METHOD AND SYSTEM EMPLOYING SECRET FUNCTIONS IN FINITE ABELIAN GROUP

(75) Inventors: Taro Terao, Nakai-machi (JP); Kil-ho Shin, Nakai-machi (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 0 days.

(21) Appl. No.: 09/138,089

(22) Filed: Aug. 21, 1998

(30) Foreign Application Priority Data

Oct. 17, 1997 (JP) ............................................ 9-285007

(51) Int. Cl.[7] ......................... H04L 19/14; H04L 19/20; H04L 19/28

(52) U.S. Cl. ........................... 713/168; 380/28; 380/30; 380/286; 713/156; 713/159; 713/171; 713/173; 713/180

(58) Field of Search ................................ 713/156, 159, 713/168, 172, 180, 171, 173; 380/30, 28, 286

(56) References Cited

PUBLICATIONS

Bruce Schneier, Applied Cryptography, Protocols, Algorithms, and Source Code in C 1996, John Wiley & Sons, Inc., Second Edition, pp. 502–511.*

Alfred J. Menezez et al., Handbook of Applied Cryptography 1997, CRC Press LLC, pp. 401–409.*

Oded Goldreich and Eyal Kushilevitz, A perfect zero–knowledge proof for a problem equivalent to discrete logarithm, Advances in Cryptography—Crypto'88, vol. 403 of Lecture Notes in Computer Science, pp. 57–70, Aug. 21–25, 1988.*

Louis Claude Guillou and Jean–Jacques Quisquater, A "Paradoxical" identity–based signature scheme resulting from zero–knowledge , Advances in Cryptography—Crypto'88, vol. 403 of Lecture Notes in Computer Science, pp. 216–231, Aug. 1988.*

L. Goillou et al., "A Practical Zero–Knowledge Protocol Fitted to Security Microprocessor Minimizing Both Transmission and Memory", *Advances in Cryptology EUROCRYPT '87, C.G. Guenther (ed.), Springer–Verlag*, pp. 123–128.

D. Chaum, "Online Cash Checks", *Advances in Cryptology EUROCRYPT '89, J.J. Quisquater, J. Vandewalle (ed.), Springer–Verlag*, pp. 288–293.

A. Fiat et al., "How to Prove Yourself: Practical Solutions to Identification and Signature Problems", *Advances in Cryptology, CRYPTO '86, A.M. Odlyzko (ed.), Springer–Verlag*, pp. 186–194.

L. Guillou et al., "A "Paradoxical" Identity–Based Signature Scheme Resulting from Zero–Knowledge", *Advances in Cryptology CRYPTO '88, S. Goldwasser (ed.), Springer–Verlag*, pp. 216–231.

* cited by examiner

*Primary Examiner*—Gail Hayes
*Assistant Examiner*—Taghi T. Arani
(74) *Attorney, Agent, or Firm*—Oliff & Berridge, PLC

(57) ABSTRACT

A method and a system for authentication whereby authentication characteristic information is not disclosed to a third party when a verifier uses a verification device of a limited scale to authenticate a user's rights or qualifications. A ticket issuing device interacts with the user's interactive device having a secret function f to calculate document secret information $\mu$ based on a document m (data) to be transmitted to the interactive device, whereby the user is issued a ticket t generated from authentication characteristic information x and the document secret information $\pi$. Upon receipt of the document m, the interactive device generates the document secret information using its unique secret function f to perform an interaction based on the generated information. The interaction involves output of a commitment r, input of a challenge c, and an output of a response $\sigma$. The user converts the interaction (r, c, $\sigma$) into another interaction (r, c, s) using the ticket t to effect Guillou-Quisquater authentication.

24 Claims, 12 Drawing Sheets

AUTHENTICATION METHOD AND SYSTEM EMPLOYING SECRET FUNCTIONS IN FINITE ABELIAN GROUP

BACKGROUND OF THE INVENTION

1. Field of the Invention

The present invention relates to information security techniques. More particularly, the present invention relates to a method and a system for authentication whose basis for security resides in the difficulty in solving annihilator determining problems, wherein system users are granted a prover's function based on secret information while the secret information itself is being hidden.

2. Description of the Related Art

Decryption keys for public key cryptosystems, signature keys for signature systems and authentication keys for authentication systems are all characteristic information that authenticates those who possess these items of secret information.

Described below is a typical authentication method proposed by Guillou and Quisquater in "A practical zero-knowledge protocol fitted to security microprocessor minimizing both transmission and memory" (Advances in Cryptology EUROCRYPT '87, C. G. Guenther (ed.), Springer-Verlag, pp. 123–128).

FIG. 1 shows how this authentication method works.

In FIG. 1, it is assumed that n stands for a composite number which is difficult to factorize; G for a multiplicative group (Z/nZ)* of the ring of residue classes of rational integers modulo n; p for a prime number not dividing the Carmichael function λ(n) of n; $F_p$ for the finite field with p-elements; D for a space of commitments; π for a function from G to D; $I \epsilon G$ for public verification information; and $x \epsilon G$ for authentication characteristic information satisfying $Ix^p=1$.

Those who possess authentication characteristic information x may carry out the following proverr's operations:

1. Generate a random number $k \epsilon G$ and transmit a commitment $r=\pi(k^p)$.
2. Transmit a response $s=kx^c$ in reply to a given challenge $c \epsilon F_p$.

Any party who knows verification information I can verify the prover's operations by performing the following verifier's operations to make sure that the prover indeed possesses the authentication characteristic information:

1. Upon receipt of a commitment r, transmit a randomly generated challenge $c \epsilon F_p$ to the prover.
2. Check that the returned response s satisfies $r=\pi(s^p I^c)$ The method above is built on the assumption that those who possess the secret information will keep it undisclosed. Such confidentiality makes it possible to implement encrypted statements that may be decrypted, signatures that may be generated, and authenticating procedures that may be executed, by only those who have the secret information.

The above method may be employed uniquely if those who possess the secret information will suffer disadvantages in case they disclose the information. A typical situation to which the method may apply is one in which secret information, kept by each individual, is the characteristic information that authenticates the individual in question.

In such cases, the characteristic information plays the role of keys to one's home or one's seal for official approval. In fact, it is easy to realize such keys or individuals' seals in the form of digital information as a direct application of the above-described cryptgraphic techniques. Illustratively, the lock to one's home may be constituted as a verifier according to the Guillou-Quisquater method. The lock of the home is opened only if the verification is successful. In that case, the possession of authentication characteristic information x is exactly equivalent to the custody of the key to one's home.

In contrast to the situation above where disclosure of authentication characteristic information harms the individual's interests as is the case with the key to one's home, there are circumstances in which the disclosure of the information can benefit the individual. The latter situation involves individuals possessing characteristic information that grants them rights or qualifications to receive specific services.

In such cases, unlike the earlier situation where individuals use characteristic information to authenticate themselves, the characteristic information for granting rights or qualifications cannot be distributed to those who are entitled to such privileges, the distributed information being putatively used to verify the possession of the characteristic information. Because the disclosure of characteristic information does not harm the interests of those who possess the information, they can wrongly pass it on to third parties from whom they may receive rewards in return.

Under these circumstances, conventional public key cryptosystems do not simply utilize the above-described public key cryptgraphy techniques for authentication. Instead, the techniques have been practiced in the form of three typical methods:

(1) A first conventional method involves individuals possessing secret characteristic information that is due them, while a verifier for verifying whether any individual has specific rights or qualifications retains information about the individuals and the secret characteristic information owned by the individuals. According to this method, disclosure of the characteristic information harms individuals' interests. As such, the method is suitable for authenticating rights and qualifications granted to individuals.

(2) A second conventional method involves individuals possessing secret characteristic information that is due to them, while a verifier for verifying whether any individual has specific rights or qualifications retains public information about the individuals as well as public information corresponding to the secret characteristic information owned by the individuals. According to this method, disclosure of the characteristic information also harms individuals' interests. As such, the method is also suitable for authenticating rights and qualifications granted to individuals.

(3) A third conventional method works as follows: a party that grants rights or qualifications furnishes each of the recipients of these rights or qualifications with a signature generated by use of characteristic information owned by the privilege-granting party. A verifier verifies the signature to authenticate the demanded rights or qualifications. An example of this method is discussed by D. Chaum in "Online Cash Checks" (Advances in Cryptology EUROCRYPT '89, J. J. Quisquater, J. Vandewalle (ed.), Springer-Verlag, pp. 288–293).

This method is free from problems associated with leaks of characteristic information because those who are to prove the possession of the rights or qualifications do not retain the characteristic information.

The first conventional method above requires the verifier to retain a list of those who possess the rights or qualifications granted to them. The requirement poses a storing and administrative burden on the verifier and necessitates provision of a high-performance verification device. Because the verifying device cannot be made independently of those who grant the specific rights or qualifications, constant exchanges of information are required between the verification device and the privilege-granting party.

Since the verifier retains individuals' characteristic information, the individuals to be authenticated by this method are vulnerable to wrongful leaks of such characteristic information.

The second characteristic method above also requires the verifier to retain a list of those who possess the rights or qualifications granted to them. The requirement poses a storing and administrative burden on the verifier and necessitates provision of a high-performance verification device. Likewise, because the verifying device cannot be made independently of those who grant the specific rights or qualifications, constant exchanges of information are required between the verification device and the privilege-granting party.

Where the third conventional method above is in use, distributed signature information may be used by anyone. This requires that the signature be protected against duplication. The requirement is met by preventing double use of each signature value. Specifically, all signature values, once used, are stored by the verifier so that the latter will make sure that any signature value is used only once. For the verifier to implement this function requires installing a high-performance verification device. In addition, constant exchanges of information are needed between verification devices so that the devices may share a list of once-used signature values.

As outlined, the three convention methods above are all subject to serious disadvantages. In particular, it is difficult for the verifier to implement verification devices or programs on a limited scale.

By contrast, the authentication method mentioned earlier and based on characteristic information indicating granted rights or qualifications is more advantageous. According to this method, verification only requires authenticating the possession of such characteristic information.

As described, the conventional techniques are vulnerable to leaks of authentication characteristic information to a third party if the verification device for authenticating rights or qualifications is limited in scale. To eliminate the risk of such leaks requires building a large-scale verification device.

It is therefore an object of the present invention to provide a method and a system for authentication implemented in the form of a small-scale verification device for preventing leaks of authentication characteristic information to a third party upon authentication of rights or qualifications.

SUMMARY OF THE INVENTION

In carrying out the present invention and according to one aspect thereof, there are provided a method and a system for authentication making use of:

1. an interactive device for generating document secret information based on a document, i.e., information which can be made public and which is determined upon issuance of a ticket, the interactive device interacting with a prover for authentication on the basis of the generated document secret information; and
2. a ticket which is generated from the document secret information and authentication characteristic information and which constitutes information that can be made public.

The workings of the present invention are outlined below in preparation for subsequent descriptions of embodiments.

FIG. 2 is a schematic view showing an overall constitution of an authentication system embodying the present invention.

In FIG. 2, a ticket issuing party 400 issues interactive devices 300 and distributes them to users, each device being characterized by its unique secret function. If the secret function characterizing a given interactive device 300 were known to a user, the interactive device 300 would be copied freely leading to the abusive issue of tickets that cannot be controlled by the ticket issuing party. To prevent such misuse requires protecting the secret function of each interactive device 300 against theft—even by its legitimate owner. The interactive device 300 may be implemented illustratively as a so-called smart card (IC card).

Initially, data m called a document is input to an interactive device 300. In turn, document secret information is generated by use of a secret function f unique to the interactive device 300 in question. The interactive device 300 then interacts with a prover 200 in accordance with the document secret information.

More specifically, the interaction proceeds in the following sequence:

1. Output commitment r.
2. Input challenge c.
3. Output response $\sigma$.

The interaction above is basically the same in format as the interaction carried out by the prover with the verifier under the Guillou-Quisquater authentication method mentioned earlier, the latter method being illustrated in FIG. 1.

Documents are not limited to being used for generating document secret information. Documents can also constitute programs or commands that may be executed by the interactive device 300, or can be parameters of processes that may be carried out by the interactive device 300.

When issuing tickets t each corresponding to authentication characteristic information x, the ticket issuing party does so by distributing to users a function for generating an interaction (r, c, s) based on the authentication characteristic information x, as follows:

The ticket issuing party first uses the ticket issuing device 400 to calculate document secret information $\mu$ based on a secret function f of the interactive device 300 owned by each user and on a document m to be transmitted to the interactive device 300 upon generation of an interaction. A ticket t generated from the authentication characteristic information x and the document secret information $\mu$ is issued to the user in question.

The authentication characteristic information x and the document secret information are not disclosed to the user.

In turn, the user inputs the designated document m to the interactive device 300 to generate an interaction (r, c, $\sigma$). Using the issued ticket, the user converts the interaction (r, c, $\sigma$) into the interaction (r, c, s) based on the authentication characteristic information corresponding to the ticket.

If process instructions are described in the document for the interactive device 300, the generation of the interaction by use of the ticket is associated with the instructions written in the document. The instructions can then be used to condition the effectiveness of the ticket.

Specifically, the conversion of the interaction is made possible by calculating a response s based on the challenge c, response $\sigma$ and ticket t.

The interaction (r, c, s) thus converted is exactly that which is generated by the prover adopting the Guillou-Quisquater authentication method of FIG. 1. This will be discussed in the ensuing description of embodiments.

The authentication characteristic information x corresponding to each ticket is generated independently of the document secret information that varies from one document to another for individual interactive devices 300.

The ticket issuing party may thus distribute to users the interactive function based on desired authentication characteristic information x in the form of tickets associated with desired documents. The distribution of the function is accomplished without disclosure of the authentication characteristic information.

Other objects, features and advantages of the present invention will become more apparent upon a reading of the following description and appended drawings.

DESCRIPTION OF THE PREFERRED EMBODIMENTS

Figure 1:
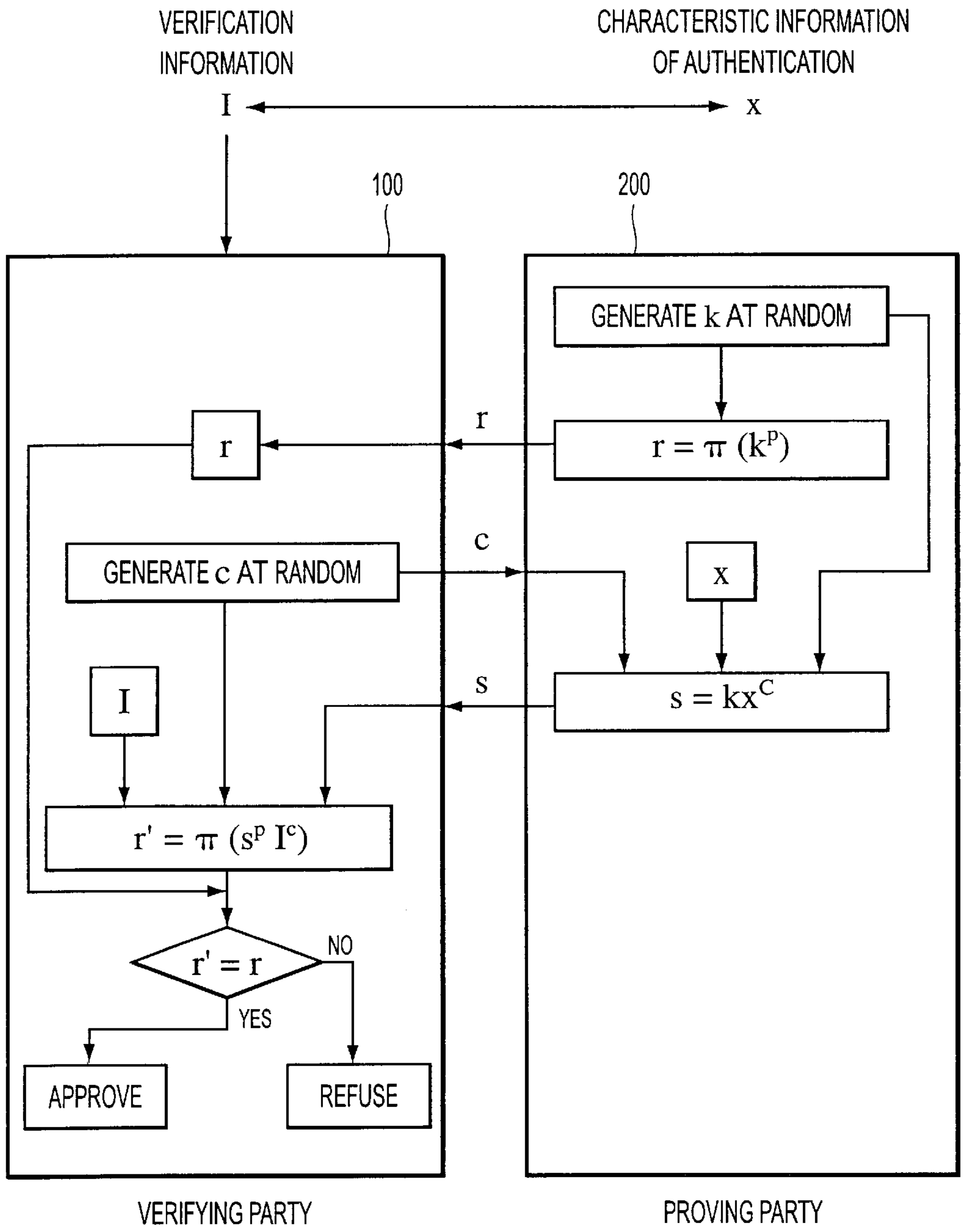
FIG. 1 is a block schematic diagram showing principles of a conventional authentication method.
Figure 2:
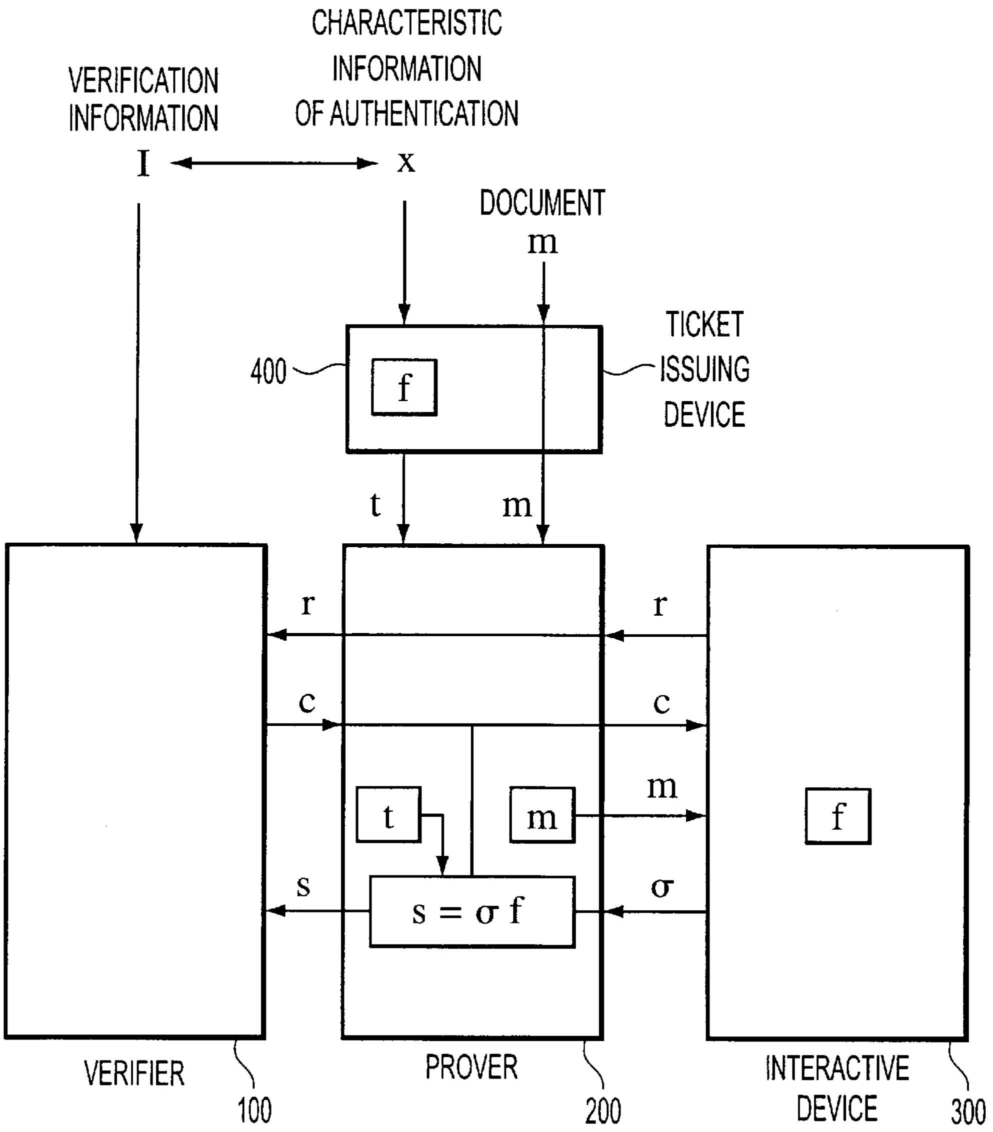
FIG. 2 is a block schematic diagram showing an overall constitution of an authentication system embodying the present invention.

Basic Components Employed by the Present Invention

Preferred embodiments of this invention will now be described. The present invention utilizes for its implementation the following basic components of cryptography:

p: prime number $F_p$: the finite field with p-elements

G: Abelian group whose annihilator is difficult to determine in terms of computational complexity D: space of commitments π: mapping from G to D Mathematical concepts used unexplained in the ensuing description are all basic concepts well known to those skilled in the art. Such concepts are explained illustratively in Encyclopedic Dictionary of Mathematics (MIT Press) edited by the Mathematical Society of Japan.

Generally, the annihilator Ann(G) of an Abelian group G written multiplicatively is the ideal of the ring Z of rational integers defined as $$Ann(G)=\{k \in Z;\ (\forall g \in G) g^k=1\}$$

Because the ring of rational integers is a principal ideal domain, it is possible to rewrite the above expression as Ann(G)=λZ by use of a generator λ∈Z of Ann(G) (where λZ is the set of all multiples of λ.) To determine the annihilator is equivalent to acquiring the generator λ∈Z of Ann (G).

If n∈Z is a composite number and if G denotes the multiplicative group (Z/nZ)* of a ring of residue classes of rational integers modulo n, then λ=λ(n), where λ(n) is the Carmichael function of n. If n represents a power to which 2 is raised, the function is given as $$\lambda(n)=\begin{cases}1 & n=2\\ 2 & n=4\\ n/4 & n\notin\{2,4\}\end{cases}$$

If n is a power to which an odd prime number p is raised, then $\lambda(n)=n(1-p^{-1})$. For an ordinary number n, if $n=\Pi p^{ep}$ represents factorization of n into prime numbers, then λ(n) is the least common multiple of $\lambda(p^{ep})$.

Thus if n is already known to be factorized into prime numbers, the annihilator of G may be obtained by use of a polynomial time of log (n). Conversely, if the generator λ of the annihilator is known, then the factorization of n into prime numbers is achieved by use of a probabilistic polynomial time of log (n) when a value g is generated so as to fulfill a non-trivial square root of unit, that is, $$g \in G;\ g \notin \{1, -1\};\ g^2=1.$$

In that case, annihilator determining problems are expectedly difficult to solve in terms of computational complexity.

It is assumed here that $p_1$ and $p_2$ are mutually prime so that $p_1 \equiv p_2 \equiv 2 \mod \mathbf{3}$; that n $=p_1, p_2$ and b are integers prime to n; that E is an Abelian scheme over Z/nZ defined by a homogeneous polynomial $$y^2Z=X^3+bZ^3$$

more specifically as $$E=\mathrm{Proj}(Z/nZ[X, Y, Z]/(Y^2Z-X^3-bZ^3))$$

and that G represents a finite group E(Z/nZ) formed by Z/nZ points of E. On these assumptions, λ is the least common multiple of $p_1+1$ and $P_2+1$. In this case, too, annihilator determining problems are expectedly difficult to solve in terms of computational complexity.

The map π may illustratively constitute the identity map id:G→G or may be a hash function h:G→D. The hash function is a function wherein mutually different m and m' satisfying h(m)=h(m') are expectedly difficult to find in terms of computational complexity. Well-known examples of this function are MD5 developed by RSA Data Security Inc., and the Secure Hash Standard (SHS) by the U.S. Federal Government.

Where the map π constitutes an identity map, there is obviously no cost of calculating π. If the map π is a hash function and if the number of bits for expressing elements of D is smaller than that which is necessary for expressing elements of G, the reduced bit length translates into a reduction in communication traffic. For example, if G=(Z/nZ)* and if the SHS is used as the map π for a composite number n of about 1024 bits whose factorization into prime numbers is difficult, then the commitment r may be compressed in size to 160 bits.

Incidentally, the bit-length of p may be about 40 for challenge-and-response type authentication systems and about 160 for signature systems. This is one reason why the Guillou-Quisquater authentication is executed at high speed than RSA.

[Interactive Device]

Figure 3:
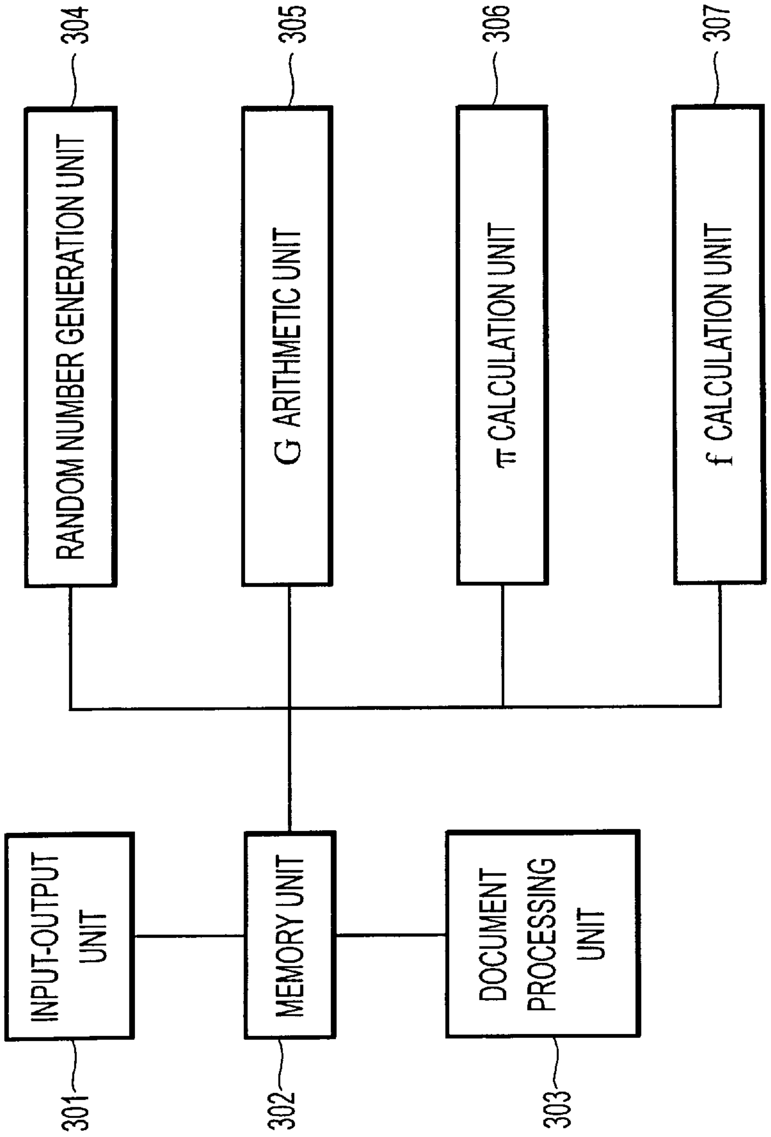
FIG. 3 is a block schematic diagram showing a typical constitution of an interactive device.

FIG. 3 shows a typical constitution of the interactive device 300 according to the present invention. Interactive devices 300 are each housed in a tamperproof enclosure and characterized by a unique secret function before being distributed to users. The interactive device 300 may be implemented illustratively in the form of a small-sized portable computation unit such as a smart card (IC card). Each interactive device 300 includes an input/output unit 301, a memory unit 302, a document processing unit 303, a randomize unit 304, a G arithmetic unit 305, a π calculation unit 306 and an f calculation unit 307.

Figure 4:
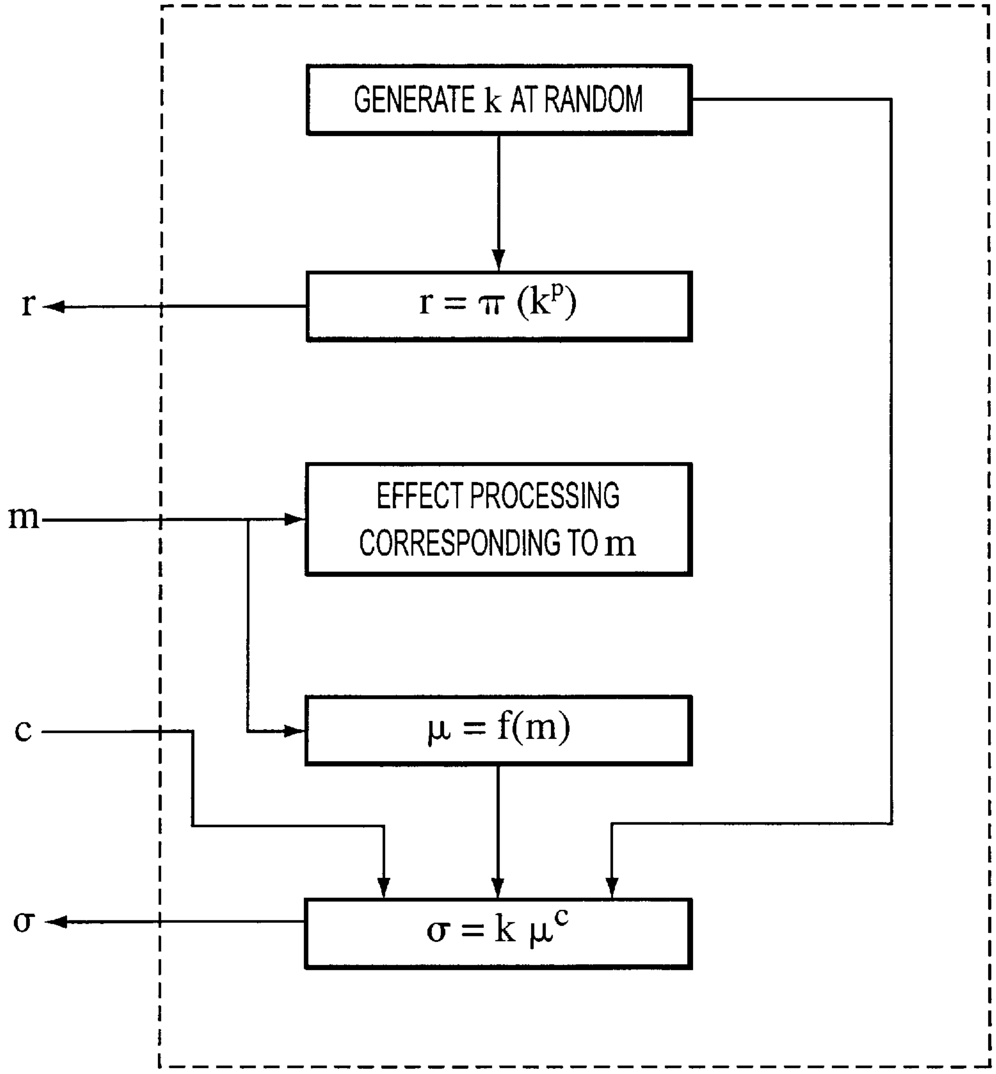
FIG. 4 is a block schematic diagram illustrating how the interactive device works.

FIG. 4 illustrates how the interactive device 300 operates. The workings of the interactive device 300 are described below.

1. Nonreproducible secret information $k \in G$ is generated by use of the randomize unit 304 and stored into the memory unit 302.
2. A commitment r is calculated by the G arithmetic unit 305 and π calculation unit 306 using the nonreproducible secret information k from the memory unit 302 as $$r=\pi(k^p)$$

The commitment r thus calculated is held in the memory unit 302. If the map n is the identity map, the π calculation unit 306 is obviously not needed.
3. The commitment r is output from the memory 302 by the input/output unit 301.
4. A challenge $c \in F_p$ is input by the input/output unit 301 and placed into the memory unit 302.
5. A document m is input by the input/output unit 301 and retained in the memory unit 302.
6. The document processing unit 303 is used to perform a process applicable to the document m held in the memory unit 302.
7. The calculation unit 307 for the secret function f unique to the interactive device 300 in question is used to calculate the document secret information $\mu \in G$ from the document m in the memory unit 302 in the form of $$\mu=f(m)$$

and the result of the calculation is placed into the memory 302.

Alternatively, the calculation unit 307 for the function f may be constituted by a memory unit that stores secret information d unique to the interactive device 300 and by a calculation unit for a hash function h, computing $$f(m)=h(d|m)$$

where, "|" stands for a bit concatenation.

8. The G arithmetic unit 305 is used to calculate a response σ based on the nonreproducible secret information k, document secret information μ and challenge c from the memory unit 302 in the form of $$\sigma=k\mu^c$$

and the result of the calculation is stored into the memory unit 302.
9. The input/output unit 301 is used to output the response σ from the memory unit 302.

The operation No. 6 above is not mandatory for some applications. This means that it is possible to build an interactive device 300 having no document processing unit 303.

Installing the document processing unit 303 makes it possible to vary the processing by the interactive device 300 for each interaction. This in turn provides issued tickets with versatile functionality, as will be described later.

(1) Constraints on the Sequence of Operations

The above operations Nos. 1 through 9 need not be carried out in that order all the time. If action A must precede action B, their order relation may be expressed illustratively as

A→B

Given such a convention, the operations above are nevertheless subjected to the following sequential constraints at all times:

1→2→3→4

5→6, 7

4, 7→8→9

If any operation of the document processing unit 303 affect other operations, the following sequential constraints come into effect:

(2) Where G, p and π are Variable

If the document m defines G, then the constraint 6→2 applies. This is a case in which parameters defining G and described in the document m are set in the operation No. 6 so that the G arithmetic unit 305 will perform calculations in accordance with the set parameters.

If the document m defines π, the constraint 6→2 also applies. In this case, parameters defining p and described in the document m are set in the operation No. 6 so that the G arithmetic unit 305 will perform calculations in accordance with the parameters thus established.

If the document m defines π, the constraint 6→2 applies. In this case, as above, parameters defining π and described in the document m are set in the operation No. 6 so that the π calculation unit 306 will perform calculations in accordance with the set parameters.

In the above examples, G, p and π vary at each interaction. Alternatively, these factors may remain fixed.

(3) Advance Execution of Power Calculations

It is assumed here that G, p and π are fixed.

If the memory unit 302 accommodates a plurality of combinations of nonreproducible secret information and commitment (k, r), then the operations Nos. 1 and 2 may be executed repeatedly beforehand in that order. This eliminates the need for generating the commitment r immediately before the input of a challenge c, thus shortening the time required for the interaction of the interactive device 300.

Only the secret function f is unique to each interactive device 300. It follows that a part for generating the commitment r may be separated and shared by the interactive devices 300 if so desired.

Figure 8:
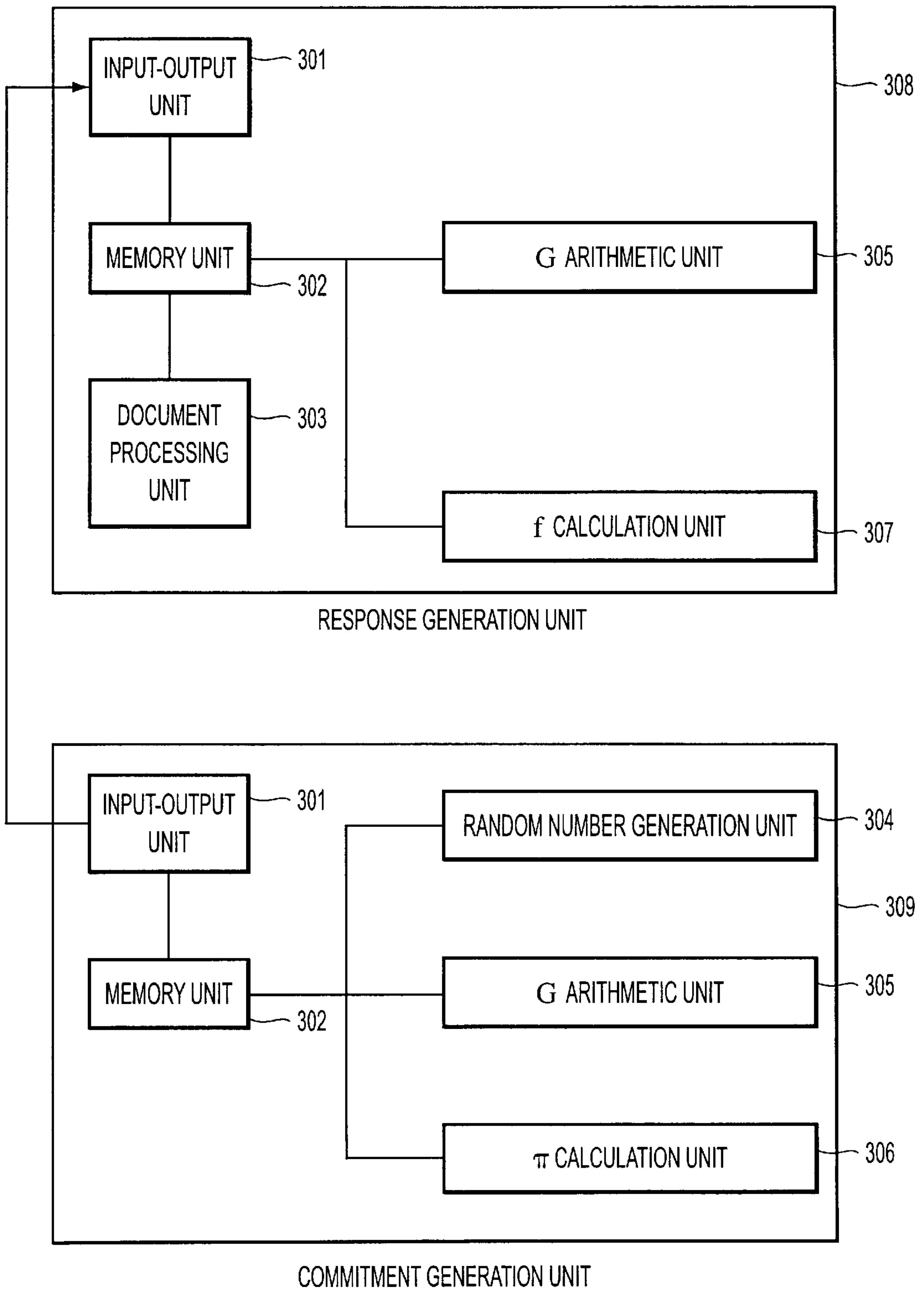
FIG. 8 is a block schematic diagram showing a typical constitution of an interactive device.

FIG. 8 shows a typical constitution of an interactive device 300 from which a power calculation part is separated. In the setup of FIG. 8, the interactive device 300 is divided into a response generation unit 308 and a commitment generation unit 309. The commitment generation unit 309 carries out the operations Nos. 1 and 2. Of the reference numerals in FIG. 8, those already used in FIG. 3 designate like or corresponding parts.

The commitment generation unit 309 transmits nonreproducible secret information k privately to the response generation unit 308. The response generation unit 308 may be implemented in the form of a smart card.

(4) Where Conditions for Response Generation are Variable

If the document m is to define conditions for response generation, the conditions are described in the document m. In such a case, arrangements need only be made to halt processing if any condition is not met in the operation No. 6.

Below are examples of specific processes dealing with different documents m.

In an example, the document m describes that condition of a challenge c which permits generation of a response. If the challenge c held in the memory unit 302 fails to meet the condition, the processing of the interactive device 300 is halted.

In another example where conditions of a challenge permit generation of a response, the document m describes parameters stating the effective period for response generation. The current time is expressed by a specific bit field representing the challenge c in a bit train. The stated effective period is compared with the current time to see if the time limit has yet to be reached. If the current time is found to be past the effective period, the processing of the interactive device 300 is halted.

In a further example, the document processing unit 303 has a timer unit that keeps the current time and the document m describes parameters defining the effective period for response generation. In the operation No. 6, the defined effective period is compared with the current time. If the current time is found to be past the effective period, the processing of the interactive device 300 is halted.

In an even further example, the document processing unit 303 has a counter and the document m describes a flag specifying whether or not to decrement a value on the counter. In the operation No. 6, if the flag specifies counter decrement, the counter value is decremented by 1 unless the counter contains zero. If the counter has zero, the processing of the interactive device 300 is halted.

In a still further example, the document processing unit 303 has a counter and the document m describes a value by which the counter is to be decremented. If the value on the counter is found to be not smaller than the value to be decremented in the operation No. 6, the counter value is decremented by the designated value. Otherwise the processing of the interactive device 300 is halted.

In a yet further example, the document processing unit 303 has a plurality of counters and the document m describes a pointer for designating each counter. If any designated counter does not have zero, the value on the counter is decremented by 1 in the operation No. 6. If the counter has zero, the processing of the interactive device 300 is halted.

In another example, the document processing unit 303 has a plurality of counters, and the document m describes a pointer for designating each counter and a value by which to decrement a counter value. If any designated counter has a value not smaller than the value to be decremented, the counter value is decremented by the designated value in the operation No. 6. Otherwise the processing of the interactive device 300 is halted.

(5) Other Examples of Document Processing

In one example, the document processing unit 303 has a counter and the document m describes a value by which to increment a value on the counter. In the operation No. 6, the counter value is incremented by the designated value.

In another example, the document processing unit 303 has a plurality of counters and the document m describes a pointer for designating each counter and a value by which to increment a counter value. In the operation No. 6, the value on any designated counter is incremented by the designated value.

In a further example, the document processing unit 303 has a timer unit that keeps the current time and a history holding unit, and the document m describes a flag specifying whether or not to record history. If the flag is found to specify recording of history in the operation No. 6, the history holding unit retains a tupple of the current time on the timer unit and the document m.

(6) Batch Processing of a Plurality of Documents

In the above-described examples, only one document m is involved in each interaction. Alternatively, a plurality of documents $m_1, \ldots, m_N$ may be handled in a single interaction.

Figure 10:
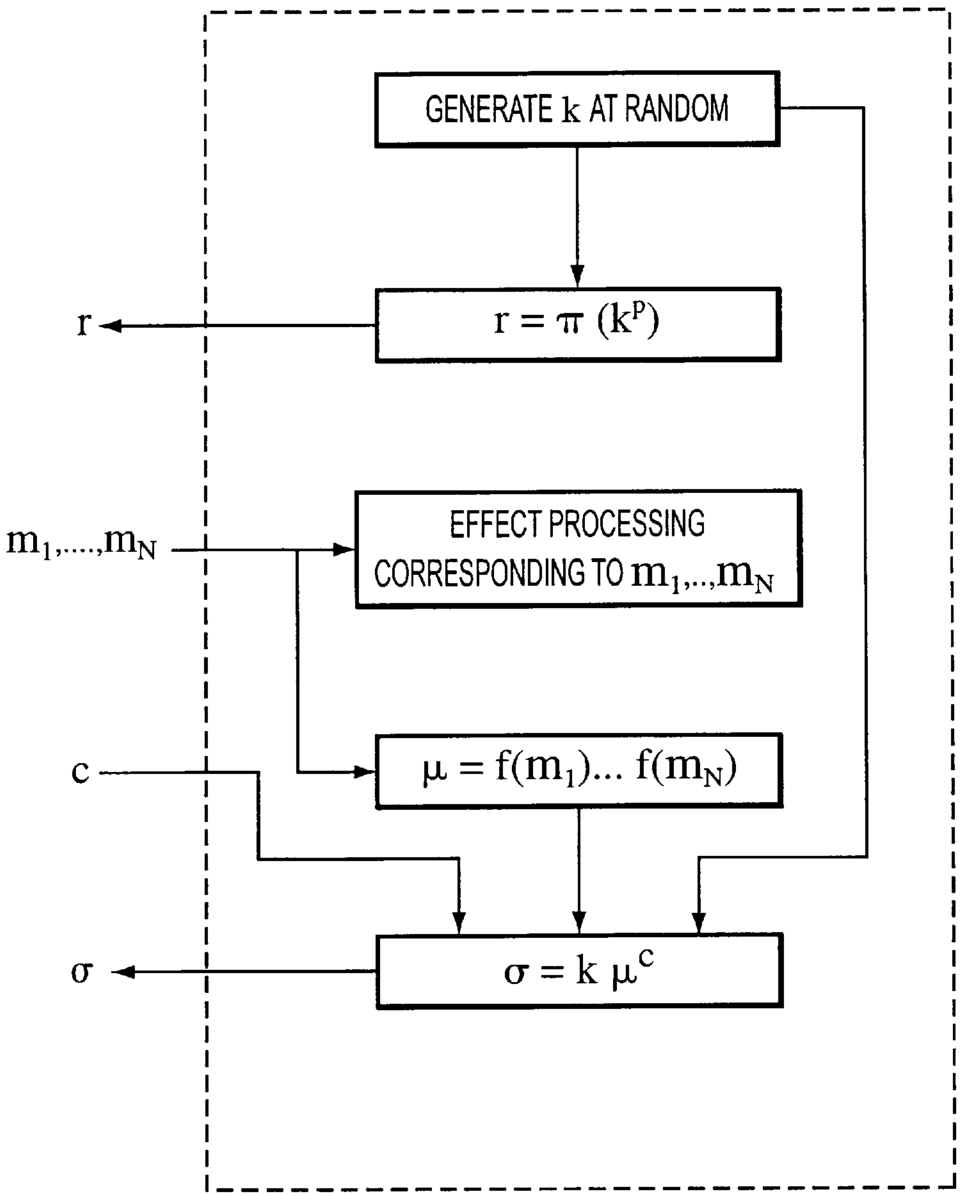
FIG. 10 is a block schematic diagram depicting how the interactive device works.

FIG. 10 depicts typical workings of an interactive device performing batch processing of a plurality of documents. Where multiple documents are to be dealt with in a single interaction, the above operations Nos. 5 through 7 may be replaced by the following operations Nos. 10 through 12:

10. Documents $m_1, \ldots, m_N$ are input by the input/output unit 301 and placed into the memory unit 302.
11. The document processing unit 303 is used to perform processes corresponding to the documents $m_1, \ldots, m_N$ held in the memory unit 302.
12. The calculation unit 307 for the secret function f unique to the interactive device 300 is used to calculate document secret information $\mu \in G$ based on the documents $m_1, \ldots, m_N$ in the memory unit 302 in the form of $$\mu = f(m_1) \ldots f(m_N)$$

and the result of the calculation is stored into the memory unit 302.

Obviously, where a plurality of documents are handled in one interaction, it is necessary to make suitable arrangements so that the results of the processes corresponding to the documents $m_1, \ldots, m_N$ will not be in conflict with one another.

[Ticket Issuing Device]

For the ticket issuing device, it is assumed that $I \in G$: verification information $x \in G$: authentication characteristic information where, the authentication characteristic information x and the verification information I meet the relation $Ix^p = 1$.

The generator λ of the annihilator Ann(G) for G is assumed here to be known. If p and λ are mutually prime, it is possible to calculate d that will satisfy $$pd \equiv 1 \bmod \lambda.$$

In that case, the authentication characteristic information x corresponding to given verification information I may be obtained as $$x = I^{-d}.$$

If p=2, the information I may be determined as desired in most cases provided that $G=(Z/nZ)^*$ and that n is a Blum number. For more details, reference should be made to "How to prove yourself: practical solutions to identification and signature problems" by Fiat and Shamir (Advances in Cryptology, CRYPTO '86, A. M. Odlyzko (ed.), Springer-Verlag, pp. 186–194).

Figure 5:
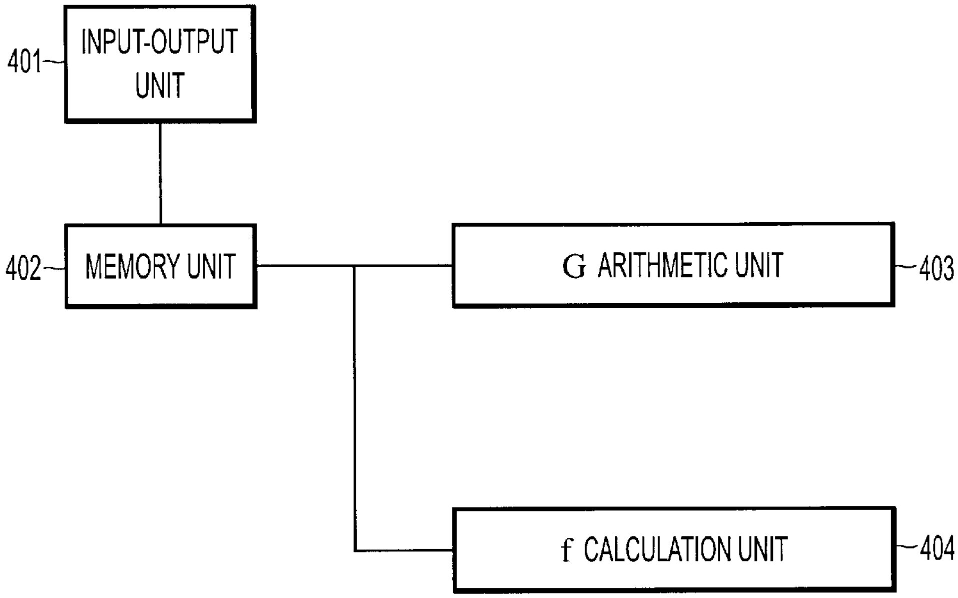
FIG. 5 is a block schematic diagram showing a typical constitution of a ticket issuing device.
Figure 6:
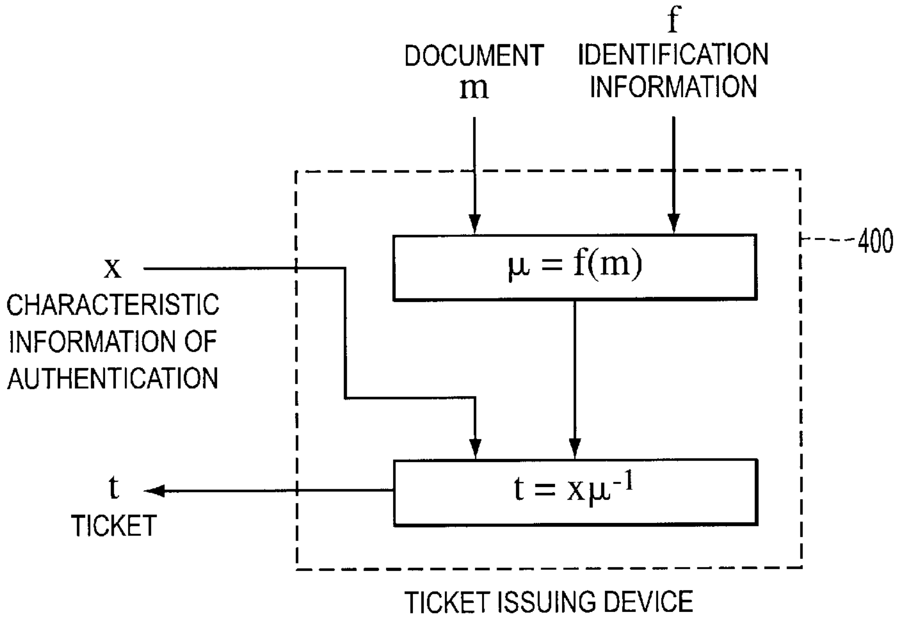
FIG. 6 is a block schematic diagram depicting how the ticket issuing device works.

FIG. 5 shows a typical constitution of the ticket issuing device 400, and FIG. 6 depicts how the ticket issuing device 400 works. The ticket issuing device 400 comprises an input/output unit 401, a memory unit 402, a G arithmetic unit 403, and an f calculation unit 404. Typical workings of the ticket issuing device 400 are described below.

1. Authentication characteristic information x is input by the input/output device 401 and stored into the memory unit 402.
2. A document m is input by the input/output device 401 and placed into the memory unit 402.

3. An identifier U of the interactive device 300 is input by the input/output unit 401 and entered into the memory unit 402.
4. The calculation unit 404 for the secret function f unique to the interactive device 300 corresponding to the identifier U in the memory unit 402 is used to calculate document secret information $\mu$ based on the document m in the memory unit 402 in the form of $$\mu=f(m)$$

and the result of the calculation is placed into the memory unit 402.
5. The G arithmetic unit 403 is used to calculate a ticket t based on the authentication characteristic information x and document secret information $\mu$ in the form of $$t=x\mu^{-1}$$

and the result of the calculation is stored into the memory unit 402.
6. The input/output unit 401 is used to output the ticket t from the memory unit 402.

As discussed in connection with the interactive device 300, the secret function f unique to the interactive device 300 may be calculated alternatively as f(m)=h(d|m) through the use of the secret information d unique to the interactive device 300 and a hash function h.

The secret information d unique to the interactive device 300 may be randomized by the ticket issuing party. Then a tupple of the identifier U for the interactive device 300 and of the randomized secret information d (U, d) may be retained.

Secret information D owned by the ticket issuing party may be used to calculate the secret information d unique to the interactive device 300 having the identifier U, in the form of $$d=U|D.$$

However, generating the secret information d in the above manner poses a potential problem. If the interactive device 300 were tampered with, the secret information D of the ticket issuing party would likely be leaked.

Instead, the hash function h may be used to generate the secret information d as $$d=h(U|D).$$

This scheme is preferable because the interactive device 300 need not retain the secret information D and because the one-way property of the hash function makes attempts to obtain D from d difficult.

The document m may take on any value that can be used as an input value to the secret function f.

The document m may also describe the process given by the interactive device 300 to the document processing unit 303, as discussed in connection with the interactive device 300.

In addition, the document m may describe information for identifying each ticket. For example, the document m may include a service provider's identifier, an identifier of the service represented by the ticket, or a sequential ID number assigned sequentially to each of the issued tickets. In another example, the ticket issuing party may manage the authentication characteristic information x and an identifier associated therewith so that the latter may be included in the document m. In a further example, the document m may include a value determined by public information I corresponding to the authentication characteristic information x.

[Ticket Composing Method]

It is assumed here that G, p and $\pi$ are common throughout the system and that the interactive device 300 handles a plurality of documents.

It is also assumed that $t_1, \ldots, t_N \in G$ constitute tickets generated for interactive devices 300 each having a unique secret function f and that $I_i \in G$ is verification information corresponding to each ticket $t_i$ where $1 \leqq i \leqq N$.

On these assumptions, composed tickets t corresponding to composed verification information $I=I_1, \ldots, I_N$ may be generated in the form of $$t=t_1, \ldots, t_N.$$

If a document $m_i$ corresponds to a ticket $t_i$ and if authentication characteristic information $x_i$ corresponds to verification information $I_i$, i.e., $I_i x_i{}_p=1$, then document secret information $\mu_i=f(m_i)$ applicable to the document $m_i$ is given as $$\mu_i=t_i^{-1}x_i.$$

Thus if $x=x_1, \ldots, x_N$, then x constitutes the authentication characteristic information corresponding to the composed verification information I, i.e., $Ix^p=1$. The document secret information $\mu=f(m_1) \ldots f(m_N)$ applicable to a plurality of documents $m_1, \ldots, m_N$ satisfies the relation $$\mu=t^{-1}x.$$

[Proving Method Using Tickets]

Figure 11:
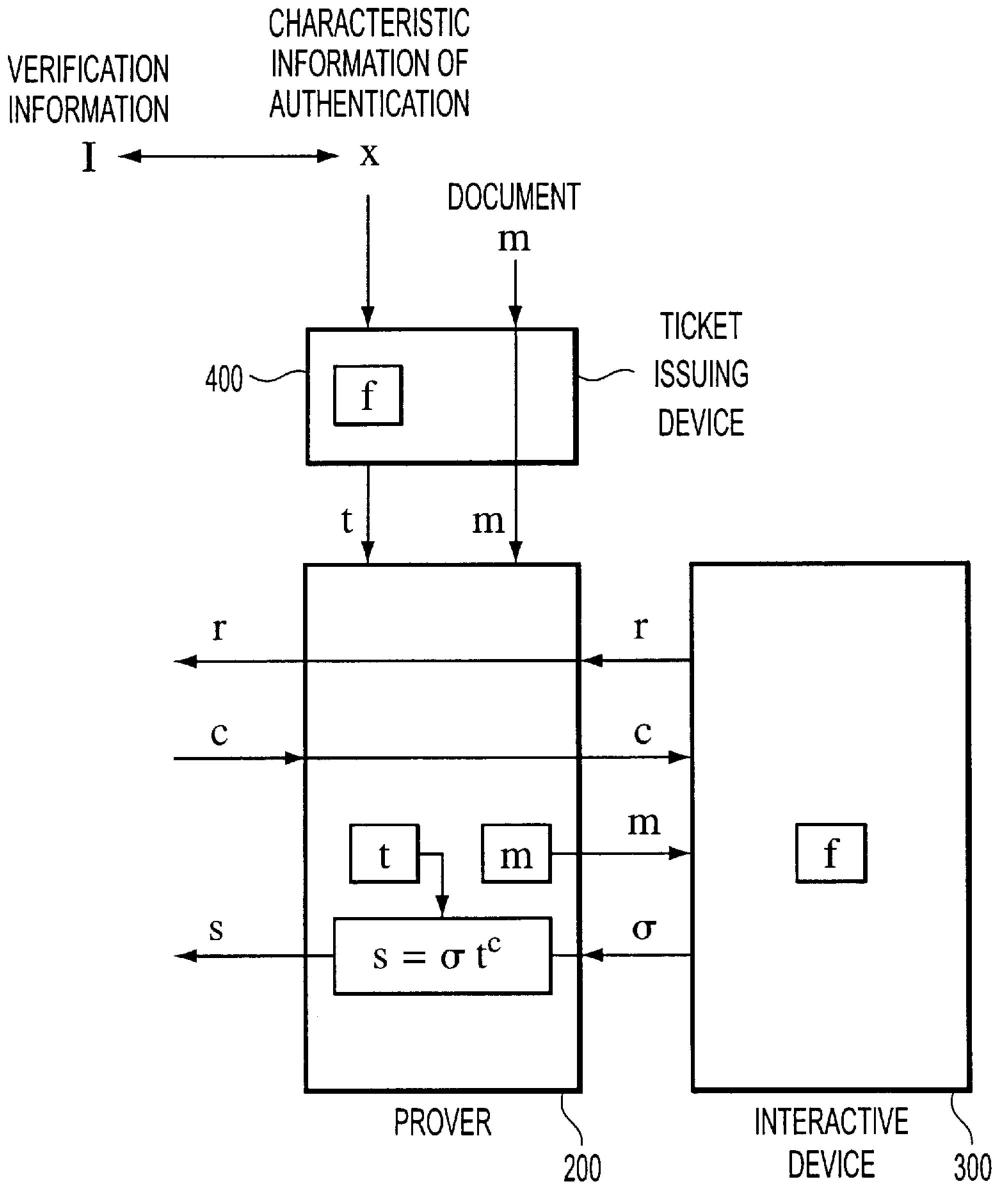
FIG. 11 is a block schematic diagram illustrating principles of a proving method using tickets.
Figure 12:
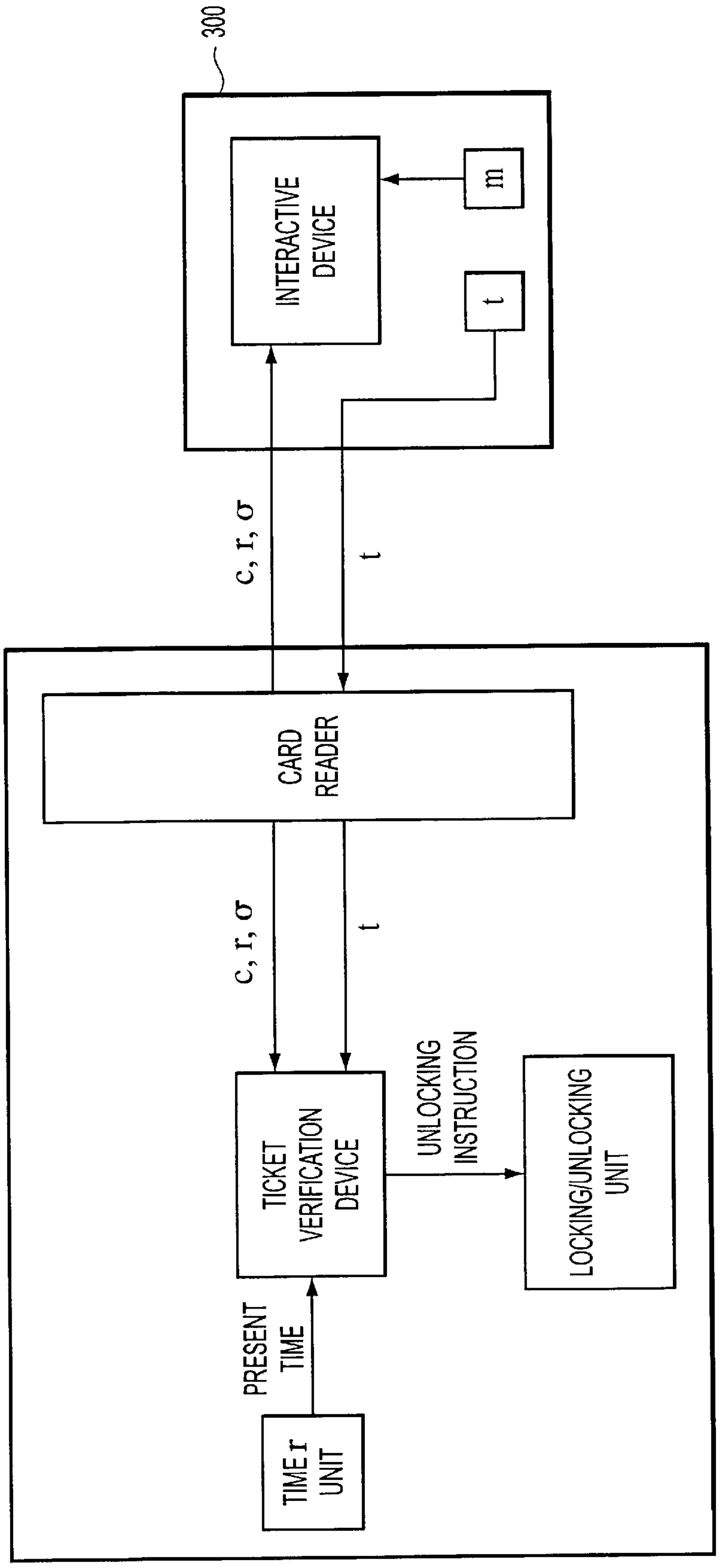
FIG. 12 is a block schematic diagram showing an application of the present invention.

FIG. 11 illustrates the flow of a proving method that uses tickets. Described below is a typical proving method using tickets as well as interactive devices. This method utilizes authentication support information in the form of tickets.

It is assumed that each user possesses an interactive device 300 characterized by a secret function f, a document m and a ticket t, the latter two satisfying the relation $t=xf(m)^{-1}$. A commitment r and a response s in reply to a challenge c are generated as follows:

1. The interactive device 300 is used to acquire the commitment r.
2. The interactive device 300 is used to obtain the document m and the response $\sigma$ corresponding to the challenge c.
3. The ticket t, the challenge c and the acquired response $\sigma$ are used to calculate the response s as $$s=t^c\sigma.$$

At this point, (r, c, s) satisfy the relation $$r=\pi(s^pI^c).$$

The method above makes it possible to distribute to each user the function of the prover 200 (shown in FIG. 1) corresponding to the verification information I through the use of the interactive device 300 and ticket t. The distribution is achieved without divulging the authentication characteristic information x to users.

The verifier 100 corresponding to the prover 200 is identical to that in the conventional setup of FIG. 1. That is, while it need only possess the only verification information I, the verification device 300 of an appreciably limited scale can complete authentication of numerous users.

(1) Fiat-Shamir authentication

Where p=2 in particular, the relation $$r=\pi(s^2I^c)$$

is satisfied, i.e., the Fiat-Shamir authentication relation is met.

It is thus possible to distribute to each user the prover's function based on Fiat-Shamir authentication and corresponding to the verification information I, by use of the interactive device 300 and ticket t. The prover's function is distributed without divulging the secret information x to users.

For more details about Fiat-Shamir authentication, reference should be made to "How to prove yourself: practical solutions to identification and signature problems" cited above.

(2) Guillou-Quisquater Authentication

In particular, if p is prime relative to the generator λ, then the user is considered to have behaved as a prover based on Guillou-Quisquater authentication.

This again makes it possible to distribute to each user the prover's function based on Guillou-Quisquater authentication and corresponding to the verification information I, through use of the interactive device 300 and ticket t. Distribution of the prover's function is effected without disclosing the secret information x to users.

[Signature Generation Method Using Tickets]

Figure 13:
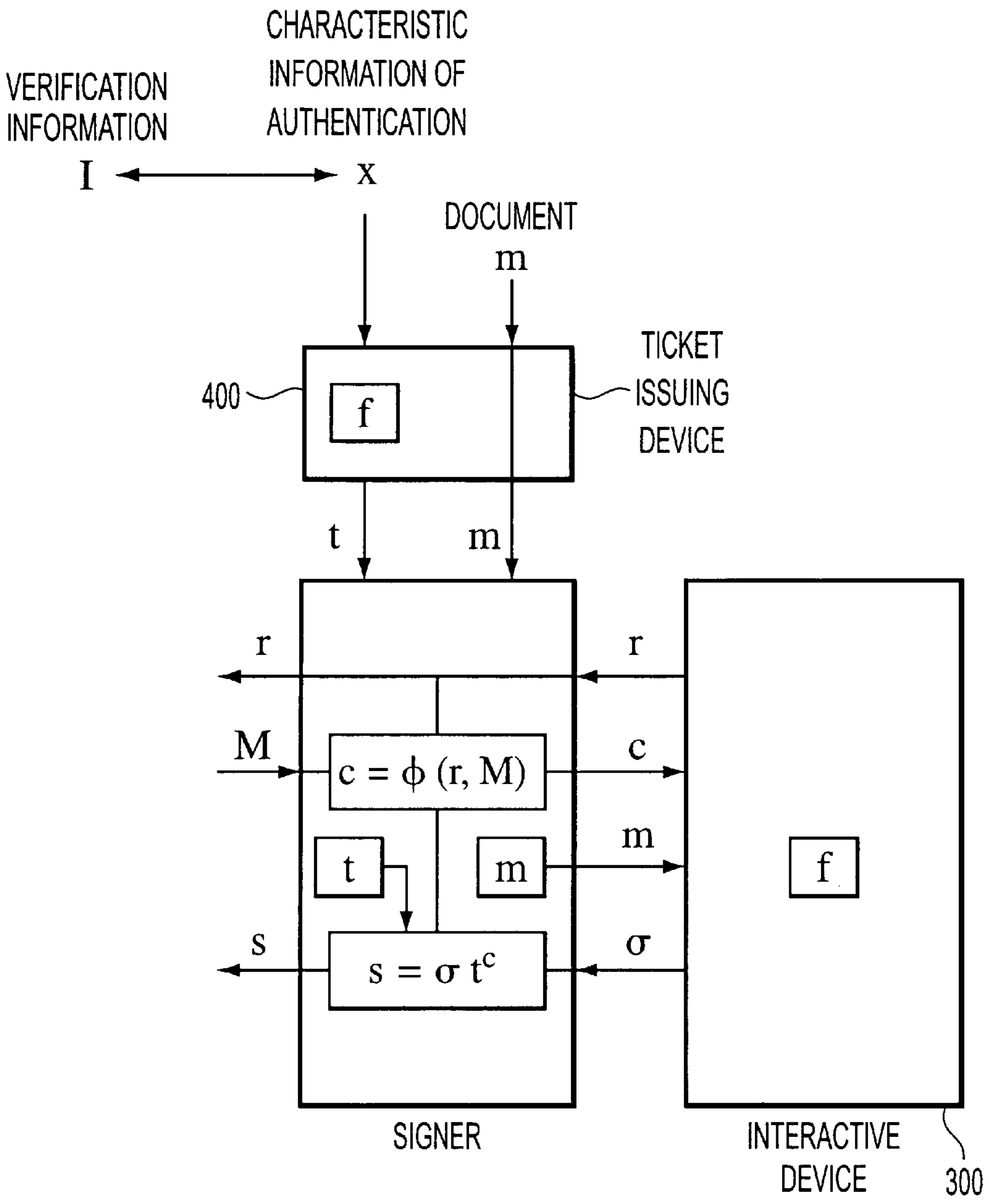
FIG. 13 is a block schematic diagram depicting principles of a signature-generating method using tickets.

FIG. 13 depicts the flow of a signature-generating method that uses tickets. Described below is a typical signature-generating method using tickets.

It is assumed that each user possesses an interactive device 300 characterized by a secret function f, a document m and a ticket t, the latter two satisfying the relation of $t=xf(m)^{-1}$; and that a map φ from G×M (the set-theoretical product of G and space of messages M) to $F_p$.

Alternatively, the map φ may be given by use of a hash function h in the form of $$\phi(r, M)=h(r|M).$$

A signature (r, s) with respect to a message M is generated illustratively as follows:

1. The interactive device 300 is used to acquire a commitment r.
2. The commitment r and message M are used to calculate a challenge as c=φ(r, M).
3. The interactive device 300 is used to obtain the document m and a response a corresponding to the challenge c.
4. The ticket t, the challenge c and the acquired response σ are used to calculate a response s as $$s=t^c\sigma.$$

At this point, the signature (r, s) satisfies $$r=\pi(s^pI^{\phi(r, M)}).$$

In employing the interactive device 300 and ticket t, the method above allows the signature function corresponding to the verification information I to be distributed to each user without disclosing the authentication characteristic information x to the user. That is, the signature function may be distributed without divulging a signature key. If the document m is arranged to include effective period information about a key or effective key use count information, it is possible to implement a signature key subject to an effective period or to a use count limit.

[Ticket Verification Device]

Figure 7:
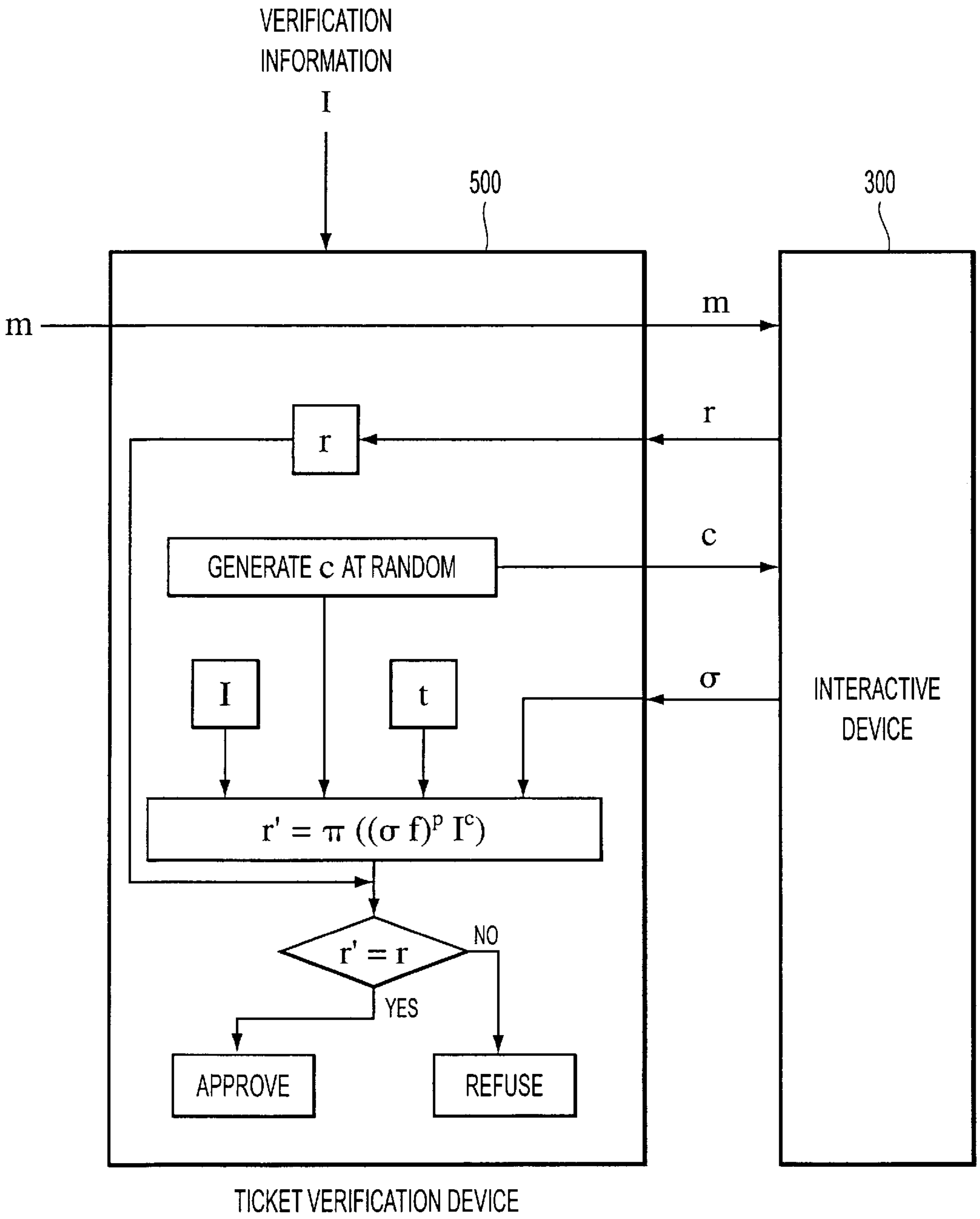
FIG. 7 is a block schematic diagram sketching how a ticket verification device works.
Figure 9:
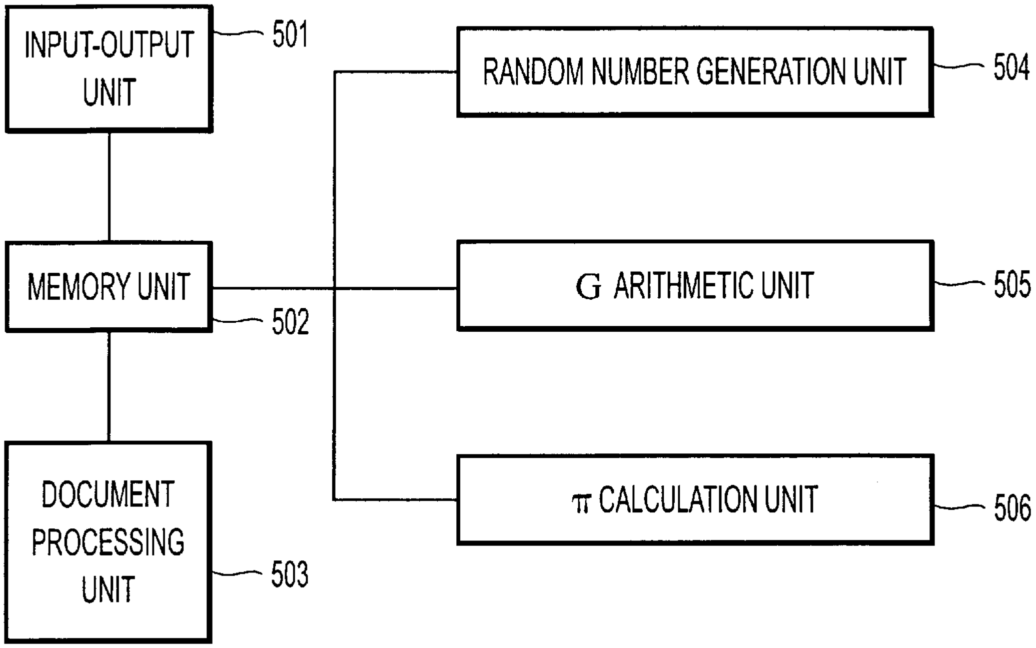
FIG. 9 is a block schematic diagram showing a typical constitution of the ticket verification device.

FIG. 9 shows a typical constitution of a ticket verification device 500, and FIG. 7 sketches typical workings of the ticket verification device 500.

The ticket verification device 500 verifies tickets by interacting with the interactive device 300. The ticket verification device 500 comprises an input/output unit 501, a memory unit 502, a document processing unit 503, a randomize unit 504, a G arithmetic unit 505 and a π calculation unit 506. How the ticket verification device 500 works will now be described.

It is assumed here that verification information I and a ticket t are stored in the memory unit 502 of each ticket verification unit.

1. A commitment r is input by the input/output unit 501 and placed into the memory unit 502.
2. A challenge c is generated by the randomize unit 504 and stored into the memory 502.
3. The input/output unit 501 is used to output the challenge c from the memory unit 502.
4. A response σ is input by the input/output unit 501 and entered into the memory 502.
5. The G arithmetic unit 505, together with the π calculation unit 506 if necessary, is used to calculate $$r'=\pi((t^c\sigma)^pI^c)$$

on the basis of c, σ, I and ticket t held in the memory unit 502. The result of the calculation is stored into the memory unit 502.

Obviously, if π is the identity map, the π calculation unit 506 is not needed.

Alternatively, r' may be calculated as $$r'=\pi((t^pI)^c\sigma^p)$$

6. A comparison is made between r and r' held in the memory unit 502. If the ticket t corresponds to the document secret information and authentication characteristic information x, then the expression $$\mu=t^{-1}x$$

is satisfied. Likewise, in an interaction based on the document secret information μ, (r, c, σ) satisfy $$r=k^p$$

$$\sigma=k\mu^c.$$

Thus in an interaction between the verification device and an interactive device whose secret function f meets μ=f(m), the relation r=r' is satisfied.

(Setup Where Tickets are Variable)

Described below is a setup in which a ticket t is input through the input/output unit 501 and retained in the memory unit 502.

Prior to the operations Nos. 1 through 6 above, the ticket verification device 500 carries out the following operation:

7. The ticket t is input by the input/output unit 501 and placed into the memory unit 502. A plurality of tickets may be verified in this manner.

Alternatively, a hash function h may be used to generate the challenge c as $$c=h(\chi|r)$$

where χ stands for a randomized challenge and r for a commitment. When verification of the interaction turns out to be successful, a signature ($\chi$, r, s) may be stored as a history of the verification into the memory unit 502. This setup makes it possible to prove to a third party that a given ticket has indeed been verified. Needless to say, if the third party is to verify the signature ($\chi$, r, s), the expression to be used for the verification is $$r=s^{p}I^{h(\chi|r)}.$$

[Application: Key]

Described below is a typical application in which the above-described prover's function using the interactive device and ticket is implemented. It is assumed for this application that authentication characteristic information $X_A$ corresponds to the key to a conference room A in a facility. It is also assumed that the ticket issuing party is the administrator of the facility and that the lock to the conference room A is constituted by the following components:

1. Smart card reader
2. Locking/unlocking unit
3. Timer unit
4. Ticket verification device implemented as a program burned into a ROM inside the smart card reader The locking/unlocking unit is usually locked. When a ticket is successfully verified, the locking/unlocking part is unlocked for 15 seconds and then locked again. The smart card reader has a slot into which to insert a smart card, the reader communicating with the inserted smart card. The timer unit keeps the current time.

The document in this case comprises three fields: a date field indicating a date (e.g., September 17); a use start time field designating the time at which to start using the facility (e.g., 14:00); and a use end time field specifying the time at which to end the use of the facility (e.g., 16:00). Each user of the facility is allowed temporary custody of a smart card composed of a ticket, a document holding unit, and an interactive device.

When the conference room is scheduled to be used, a representative of those who wish to meet in the room gains access to a conference room reservation system (i.e., ticket issuing system), and designates the time period of the scheduled meeting and the ID's of the interactive devices owned by the expected participants in the meeting. In turn, the conference room reservation system distributes tickets to the participants by electronic mail. Upon receipt of the ticket, each participant writes the ticket to his or her smart card along with a document that specifies the allowed use time.

When actually entering the conference room, each participant in the meeting inserts his/her smart card into a slot in the entrance door of the room for ticket verification. At this point, the lock of the conference room embeds the current time kept by the timer unit into a specified field of the challenge. If the current time embedded in the challenge exceeds or falls short of the effective use period described in the document, the processing of the card is halted.

In this application, the ticket is utilized as a shared key subject to a time limit.

As described, the inventive method and equipment allow a proving function based on authentication characteristic information of a public key cryptosystem to be distributed to users without disclosing the authentication characteristic information. This makes it possible for a plurality of persons with no conflict of interest therebetween to prove themselves with safety based on the same authentication characteristic information—a procedure that has been impossible conventionally.

The present invention thus makes it possible to match tickets, which do not necessarily belong to specific persons, with authentication characteristic information of a public key cryptosystem. The ticket verifier can judge the legitimacy of each ticket solely according to a disclosed procedure based on the only verification information that has been made public. The simplified scheme significantly reduces burdens on the ticket verifier. From the viewpoint of users who are required to prove their possession of authentic tickets, the above-described procedural characteristic on the part of the ticket verifier ensures the latter's fairness in that no specific users can be identified upon ticket verification (because only authentication characteristic information not belonging to any specific person is involved in the verification).

When viewed from users, tickets and interactive devices each constitute a so-called black box that can only be understood by the ticket issuing party. When a ticket is input to an interactive device, it is conventionally impossible to ascertain that no covert channel exists independently of the workings of the verification system. According to the present invention, by contrast, the transmission of information to each interactive device is implemented in the form of a document which, even if parsed completely by the user, does not detract from security on the protective side. In addition, the ticket (a black box) is not entered into the interactive device (another black box).

The present invention adopts a public key cryptosystem based on Guillou-Quisquater authentication. The zero-knowledge characteristic of Guillou-Quisquater authentication is proved by Guillou and Quisquater in "A 'paradoxical' identity-based signature scheme resulting from zero-knowledge," Advances in Cryptology CRYPTO '88, S. Goldwasser (ed.), Springer-Verlag, pp. 216–231.

As many apparently different embodiments of this invention may be made without departing from the spirit and scope thereof, it is to be understood that the present invention is not limited to the specific embodiments thereof except as defined in the appended claims.

What is claimed is:

1. An authentication method in effect where p stands for a prime number, $F_p$ for the finite field with p-elements, G for a finite Abelian group whose annihilator is difficult to obtain in terms of computational complexity, D for a space of commitments, and $\pi$ for a map from G to D, wherein a commitment $r \in D$ is generated and a response $s \in G$ is created in reply to a document m and a challenge $c \in F_p$ so that authentication is performed in accordance with authentication information $I \in G$, the commitment r and the response s, said authentication method comprising the steps of:

(a) randomizing nonreproducible secret information $k \in G$;

(b) calculating the commitment $r=\pi(k^p)$;

(c) calculating document secret information $\mu=f(m)$ where f denotes a secret function valued in said finite Abelian group G;

(d) calculating a support response $\sigma=k\mu^c$;

(e) inputting authentication support information $t=x\mu^{-1}$ generated on the basis of both authentication characteristic information $x \in G$ satisfying $Ix^p=1$ where I denotes verification information, and the document secret information $\mu$;

(f) inputting the challenge $c \in F_p$;

(g) generating the response $s=\sigma t^c$ based on the challenge c, authentication support information t and support response $\sigma$; and (h) verifying that the generated response s satisfies $r=\pi(s^p I^c)$.

2. An authentication system in effect where p stands for a prime number, $F_p$ for the finite field with p-elements, G for a finite Abelian group whose annihilator is difficult to obtain in terms of computational complexity, D for a space of commitments, and $\pi$ for a map from G to D, wherein a commitment $r \epsilon D$ is generated and a response $s \epsilon G$ is created in reply to a document m and a challenge $c \epsilon F_p$ so that authentication is performed in accordance with authentication information $I \epsilon G$, the commitment r and the response s, said authentication system comprising:

(a) a unit that randomizes nonreproducible secret information $k \epsilon G$;

(b) a unit that calculates the commitment $r=\pi(k^p)$;

(c) a unit that calculates document secret information $\mu=f(m)$ where f denotes a secret function valued in said finite Abelian group G;

(d) a unit that calculates a support response $\sigma=k\mu^c$;

(e) a unit that inputs authentication support information $t=x\mu^{-1}$ generated on the basis of both authentication characteristic information $x \epsilon G$ satisfying $Ix^p=1$ where I denotes verification information, and the document secret information $\mu$;

(f) a unit that inputs the challenge $c \epsilon F_p$;

(g) a unit that generates the response $s=\sigma t^c$ based on the challenge c, authentication support information t and support response $\sigma$; and (h) a unit that verifies that the generated response s satisfies $r=\pi(s^p I^c)$.

3. An authentication method in effect where p stands for a prime number, $F_p$ for the finite field with p-elements, G for a finite Abelian group whose annihilator is difficult to obtain in terms of computational complexity, D for a space of commitments, and $\pi$ for a map from G to D, wherein a commitment $r \epsilon D$ is generated and an authentication response $\sigma \epsilon G$ is created in reply to a document m and a challenge $c \epsilon F_p$, said interactive method comprising the steps of:

(a) randomizing nonreproducible secret information $k \epsilon G$;

(b) calculating the commitment $r=\pi(k^p)$;

(c) calculating document secret information $\mu=f(m)$ where f denotes a secret function valued in said finite Abelian group G: and (d) calculating the authentication response $\sigma=k\mu^c$.

4. The interactive method according to claim 3, wherein said prime number p is 2.

5. The interactive method according to claim 3, wherein said prime number p is prime relative to a generator $\lambda$ of the annihilator of said finite Abelian group G.

6. The interactive method according to claim 3, wherein said finite Abelian group G constitutes a multiplicative group $(Z/nZ)^*$ of the ring of residue classes of rational integers modulo n, n being a composite number.

7. The interactive method according to claim 3, wherein said finite Abelian group G constitutes a group E(Z/nZ) made up of points with values at Z/nZ in a group scheme E over the ring Z/nZ of residue classes of rational integers modulo n, n being a composite number.

8. The interactive method according to claim 3, wherein said map $\pi$ is the identity map.

9. The interactive method according to claim 3, wherein said map $\pi$ is calculated by use of a hash function.

10. An authentication device capable of at least performing the authentication method defined in claim 3, wherein the commitment r is output, the document m and challenge c are input, and the authentication response $\sigma$ is output, said interactive device comprising:

(a) an input/output unit that inputs and outputs information;

(b) a memory unit that stores information;

(c) a randomize unit that generates random numbers;

(d) an arithmetic unit that performs arithmetic operations of said finite Abelian group G;

(e) a calculation unit that calculates said map $\pi$ if necessary; and (f) a calculation unit that calculates said unique secret function f.

11. The interactive device according to claim 10, wherein processing inside said interactive device is difficult to observe from the outside thereof.

12. The interactive device according to claim 10, wherein said interactive device is implemented in the form of a small-sized portable computation unit.

13. The interactive device according to claim 10, wherein said calculation unit that calculates said unique secret function f includes:

(a) a unit that holds unique secret information d; and (b) a unit that calculates a hash function h;

wherein said hash function h is used to calculate said document secret information $\mu$ based on said unique secret information d and said document m.

14. The interactive device according to claim 10, further comprising a unit that performs a process suitable for said document m.

15. The interactive device according to claim 14, wherein said document m defines at least part of said finite Abelian group G, said prime number p and said map $\pi$.

16. The interactive device according to claim 14, wherein said document m defines conditions for generating a response.

17. The interactive device according to claim 10, wherein document secret information $\mu=f(m_1), \ldots, f(m_N)$ is calculated with respect to a plurality of documents $m_1, \ldots, m_N$.

18. A ticket issuing method for use with the interactive device according to claim 10, wherein authentication characteristic information $x \epsilon G$ corresponding to verification information $I \epsilon G$ satisfies $Ix^p=1$, said ticket issuing method generating a ticket $t \epsilon G$ destined for said interactive device having said document m and said unique secret function f, the method comprising the steps of:

(a) calculating document secret information $\mu=f(m)$; and (b) calculating the ticket $t-x\mu^{-1}$.

19. A ticket verification method for verifying a ticket corresponding to the verification information I defined in claim 18, said ticket verification method comprising the steps of:

(a) acquiring a commitment r;

(b) randomizing a challenge c;

(c) obtaining a response $\sigma$; and (d) ascertaining that $r=\pi((\sigma t^c)^p I^c)$.

20. A ticket verification device capable of at least performing the verification defined in claim 19, wherein said ticket verification device having the verification information I and ticket t inputs a commitment r, outputs a challenge c and inputs a response $\sigma$ to verify legitimacy of said ticket t, said ticket verification device comprising:

(a) an input/output unit that inputs and outputs information;

(b) a memory unit that stores information;

(c) a randomize unit that generates random numbers;

(d) an arithmetic unit that performs arithmetic operations of said finite Abelian group G; and (e) a calculation unit that calculates said map π if necessary.

21. The ticket issuing method according to claim 18, wherein said document m is dependent on said authentication characteristic information x.

22. The ticket issuing method according to claim 18, wherein said document m includes information for identifying said authentication characteristic information x.

23. The ticket issuing device for use with a ticket issuing method according to claim 18, wherein said authentication characteristic information x, said document m and information for identifying an interactive device are input and said ticket t is output in return, said ticket issuing device comprising:

(a) an input/output unit that inputs and outputs information;

(b) a memory unit that stores information;

(c) a calculation unit that calculates said unique secret function f; and (d) an arithmetic unit that performs arithmetic operations of said finite Abelian group G.

24. A ticket composing method in effect where a ticket $t_i \epsilon G$ applicable to an interactive device having the verification information $I_i \epsilon G$ and unique secret function f defined in claim 18 is furnished in the form of $I_1, t_1, \ldots, I_N, t_N$, said ticket composing method generating in the form of $t=t_1, \ldots, t_N$ a composed ticket t corresponding to composed verification information $I=I_1, \ldots, I_N$.

* * * * *